(12) United States Patent
Brak et al.

(10) Patent No.: US 11,474,806 B2
(45) Date of Patent: Oct. 18, 2022

(54) AUTOMATICALLY PRODUCING AND CODE-SIGNING BINARIES

(71) Applicant: Salesforce.com, Inc., San Francisco, CA (US)

(72) Inventors: Claudia Brak, San Francisco, CA (US); Steven Holly, Laguna Niguel, CA (US); Brian Simmons, San Francisco, CA (US); Jayal Mehta, San Francisco, CA (US); Urvin Thakkar, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/160,950

(22) Filed: Jan. 28, 2021

(65) Prior Publication Data

US 2021/0149664 A1 May 20, 2021

Related U.S. Application Data

(63) Continuation-in-part of application No. 16/892,107, filed on Jun. 3, 2020, which is a continuation-in-part of application No. 16/688,504, filed on Nov. 19, 2019.

(51) Int. Cl.
  *G06F 9/44* (2018.01)
  *G06F 8/65* (2018.01)
  *G06Q 30/00* (2012.01)

(52) U.S. Cl.
  CPC ............... *G06F 8/65* (2013.01); *G06Q 30/01* (2013.01)

(58) Field of Classification Search
  CPC .................................. G06F 8/65; G06Q 30/01
  See application file for complete search history.

(56) References Cited

U.S. PATENT DOCUMENTS

| 8,621,226 B1 * | 12/2013 | Hackborn | H04L 63/0823 |
| | | | 713/176 |
| 2007/0250711 A1 * | 10/2007 | Storey | H04W 12/35 |
| | | | 713/168 |

(Continued)

FOREIGN PATENT DOCUMENTS

| AU | 2019236631 A1 | 4/2020 |
| CA | 3056282 A1 | 3/2020 |

(Continued)

OTHER PUBLICATIONS

Como, "Submit Your App via Como to the Apple App Store", https://help.como.com/hc/en-us/articles/201581592-Submit-Your-App-via-Como-to-the-Apple-App-Store, Internet Archive Aug. 18, 2016 (Year: 2016).

(Continued)

*Primary Examiner* — Hang Pan
(74) *Attorney, Agent, or Firm* — Kwan & Olynick LLP

(57) ABSTRACT

A mobile application development environment may be maintained in association with a computing platform. A request to produce a binary of a first mobile application may be processed. The binary and a package configurable to cause the binary to have code-sign credentials associated with a first organization when the binary is uploaded to a mobile application provider may be produced. The binary and the package may be provided to the first organization.

20 Claims, 7 Drawing Sheets

(56) References Cited

U.S. PATENT DOCUMENTS

| | | | |
|---|---|---|---|
| 2009/0210702 A1* | 8/2009 | Welingkar | H04W 12/35 713/156 |
| 2012/0090021 A1 | 4/2012 | Luh | |
| 2012/0260232 A1* | 10/2012 | Hirsch | G06F 8/71 717/107 |
| 2013/0054792 A1 | 2/2013 | Sharaf | |
| 2014/0019456 A1 | 1/2014 | Li | |
| 2015/0347970 A1 | 12/2015 | Kirtane | |
| 2016/0188350 A1* | 6/2016 | Shah | G09C 1/00 717/148 |
| 2016/0292066 A1 | 10/2016 | Stevens | |
| 2017/0147338 A1 | 5/2017 | Jackson | |
| 2020/0097264 A1 | 3/2020 | Holly et al. | |
| 2020/0394122 A1 | 12/2020 | Burde | |
| 2021/0149640 A1 | 5/2021 | Brak | |
| 2021/0149664 A1 | 5/2021 | Brak | |

FOREIGN PATENT DOCUMENTS

| | | |
|---|---|---|
| EP | 3627312 A1 | 3/2020 |
| JP | 2020053050 A | 4/2020 |

OTHER PUBLICATIONS

Xamarin, Using TestFlight to Distribute Xamarin.iOs Apps, https://docs.microsoft.com/en-us/xamarin/ios/deploy-test/testflight7tabs=macos, published Mar. 19, 2017, accessed on Mar. 10, 2021 (Year: 2017).

Office Action (Final Rejection) dated Dec. 30, 2021 for U.S. Appl. No. 16/688,504 (pp. 1-10).

Office Action (Final Rejection) dated Mar. 29, 2022 for U.S. Appl. No. 16/892,107 (pp. 1-9).

Office Action (Non-Final Rejection) dated Jul. 13, 2022 for U.S. Appl. No. 16/688,504 (pp. 1-9).

\* cited by examiner

Register an App ID

Platform
iOS, macOS, tvOS, watchOS

App ID Prefix
FQU5TBXUKS (Team ID)

Description
You cannot use special characters ...

Bundle ID ● Explicit ○ Wildcard com.testcompany

We recommend using a reverse-domain name style string (i.e., com.domainname.appname). It cannot contain and asterisk (*).

Capabilities

| ENABLED | NAME | |
|---|---|---|
| ☐ | Access WiFi information ⓘ | |
| ☐ | App Attest ⓘ | |
| ☑ | App Groups ⓘ | Edit  Enabled App Groups (1) |
| ☐ | Apple Pay Payment Processing ⓘ | |
| ☑ | Associated Domains ⓘ | Configure |
| ☐ | AutoFill Credential Provider ⓘ | |
| ☐ | SiriKit ⓘ | |
| ☐ | Custom Network Protocol ⓘ | |
| ☑ | Data Protection ⓘ<br>● Complete Protection<br>○ Protected Unless Open<br>○ Protected Until First User Authentication | |

Back  Continue

Figure 4

AUTOMATICALLY PRODUCING AND CODE-SIGNING BINARIES

CROSS-REFERENCE TO RELATED APPLICATIONS

This patent document is a continuation-in-part of and claims priority to U.S. patent application Ser. No. 16/892,107 by Brak et al., titled "AUTOMATICALLY PRODUCING MOBILE APPLICATION BINARIES", filed Jun. 3, 2020, which is a continuation-in-part of and claims priority to U.S. patent application Ser. No. 16/688,504 by Brak et al., titled "PRODUCING MOBILE APPLICATIONS", filed Nov. 19, 2019. U.S. patent application Ser. No. 16/688,504 and U.S. patent application Ser. No. 16/892,107 are both hereby incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally mobile applications and more specifically to producing mobile applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks in association with production of mobile applications.

BRIEF DESCRIPTION OF THE DRAWINGS

The included drawings are for illustrative purposes and serve only to provide examples of possible structures and operations for the disclosed inventive systems, apparatus, methods and computer program products for automatically producing mobile application binaries. These drawings in no way limit any changes in form and detail that may be made by one skilled in the art without departing from the spirit and scope of the disclosed implementations.

FIG. 4 shows an example of a GUI, in accordance with some implementations.

DETAILED DESCRIPTION

Figure 1:
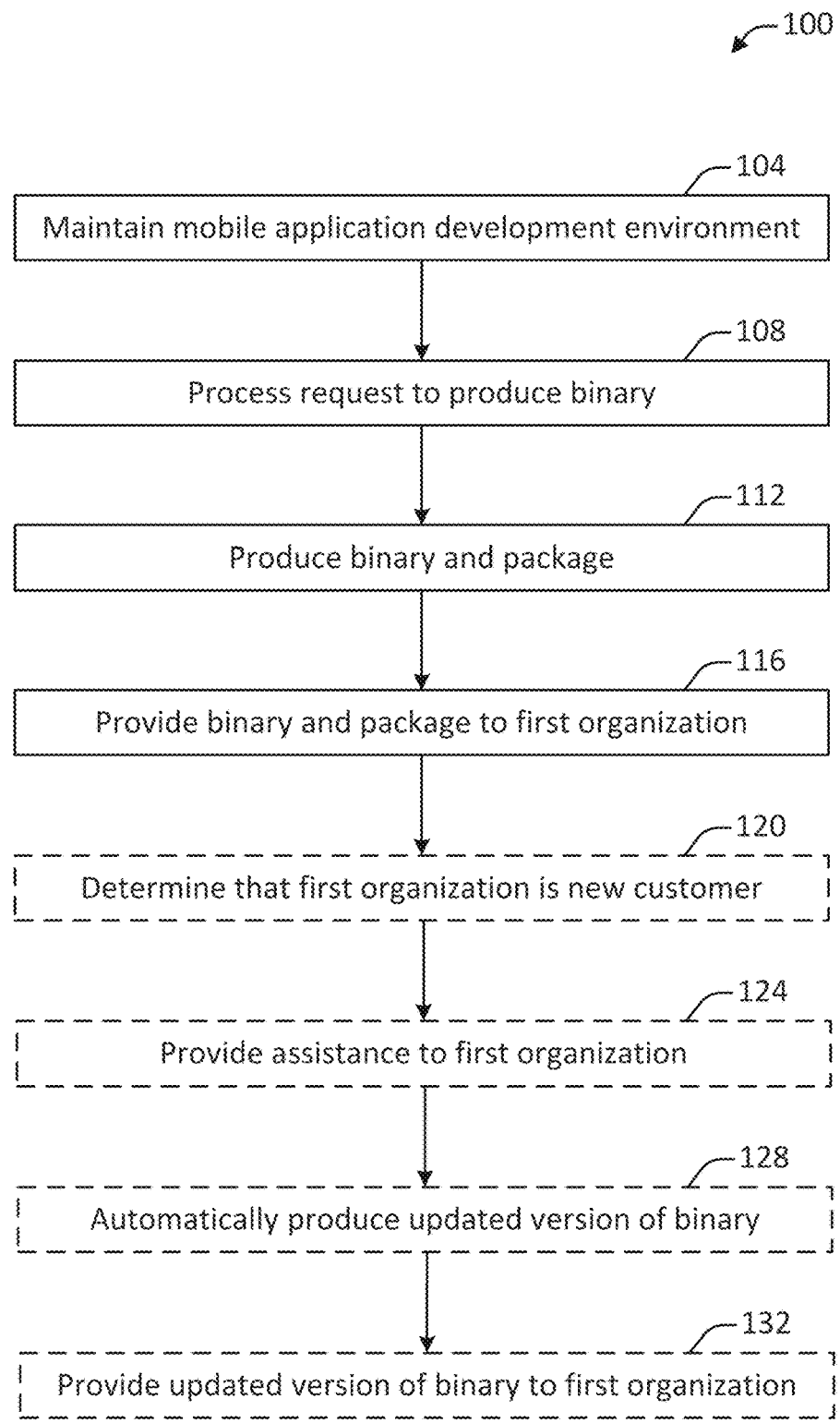
FIG. 1 shows a flowchart of an example of a method for automatically producing and code-signing mobile application binaries, in accordance with some implementations.

Some implementations of the disclosed systems, apparatus, methods and computer program products are configured for automatically producing and code-signing mobile application binaries. As described in further detail below, such binary production and uploading techniques may be implemented alone or in association with any type of computing platform such as a Customer Relationship Management (CRM) Platform, a social networking system, any type of consumer or business software, etc. While CRM platforms (such as those provided by Salesforce.com®, inc.) are discussed herein as an example of such a computing platform, one having skill in the art can appreciate that the examples of computing platforms described herein may be substituted for any suitable computing platform such as those described above.

Existing automated binary production methods often require a computing platform to access an organization's sensitive information when the organization requests binary production. For example, such an organization may need to give the computing platform access to accounts for mobile application providers, such as the Apple® App Store or the Google® Play Store. Such a framework creates a variety of concerns—e.g., a requesting organization's app store account may become susceptible to any security vulnerabilities of the computing platform. Accordingly, many organizations with sensitive security needs may not be able to take advantage of automated binary production techniques, losing valuable productivity. By way of illustration, General Elizabeth Bennet leads Health Security Services (HSS), an elite government unit charged with the management of health security for a nation. Due to a global pandemic, neither General Bennet nor any employees of HSS have spare time to spend on producing mobile applications. Nevertheless, HSS is in desperate need of an employee mobile application to meet its organizational demands. Unfortunately, HSS cannot risk giving any computing platform access to any of its mobile application provider accounts; and, therefore, cannot use existing automated binary production methods. This situation results in organizational strain, hampering HSS's ability to combat the pandemic.

By contrast, the disclosed techniques may be implemented to mitigate the above-described security concerns. For instance, computing platforms can generate binaries and provide these binaries to a requesting organization along with a package that causes the binary to have the requesting organization's code signing certificate, as described in further detail below. The binary can then be uploaded to the account of the requesting organization without providing the computing platform access to the account. Returning to the example described in the preceding paragraph, HSS may use the disclosed techniques to request automated production of a binary for the HSS employee mobile application for upload to the Apple® App Store. The computing platform may provide the binary to HSS along with an automatically generated package. The package may be used by HSS to cause the binary to have HSS's code-sign credentials. The binary may then be uploaded to the Apple® App Store without allowing the computing platform to have any access whatsoever to HSS's Apple® App Store account, thus eliminating the security vulnerabilities described above.

In some implementations, all management and distribution of the HSS employee mobile application may be handled entirely by HSS itself. In this example, only production is handled by a computing platform. HSS may freely distribute the employee mobile application any way the organization deems fit. For example, HSS may distribute the employee mobile application in bulk via Mobile Device Management (MDM) to all official HSS devices.

Also or alternatively, the framework described herein may be flexible. For example, as described below, binaries and packages may be automatically produced to meet different requirements of different mobile application providers. Additionally, even though mobile applications may be fully managed directly by an organization, a computing platform may provide fully automated updates.

Figure 2:
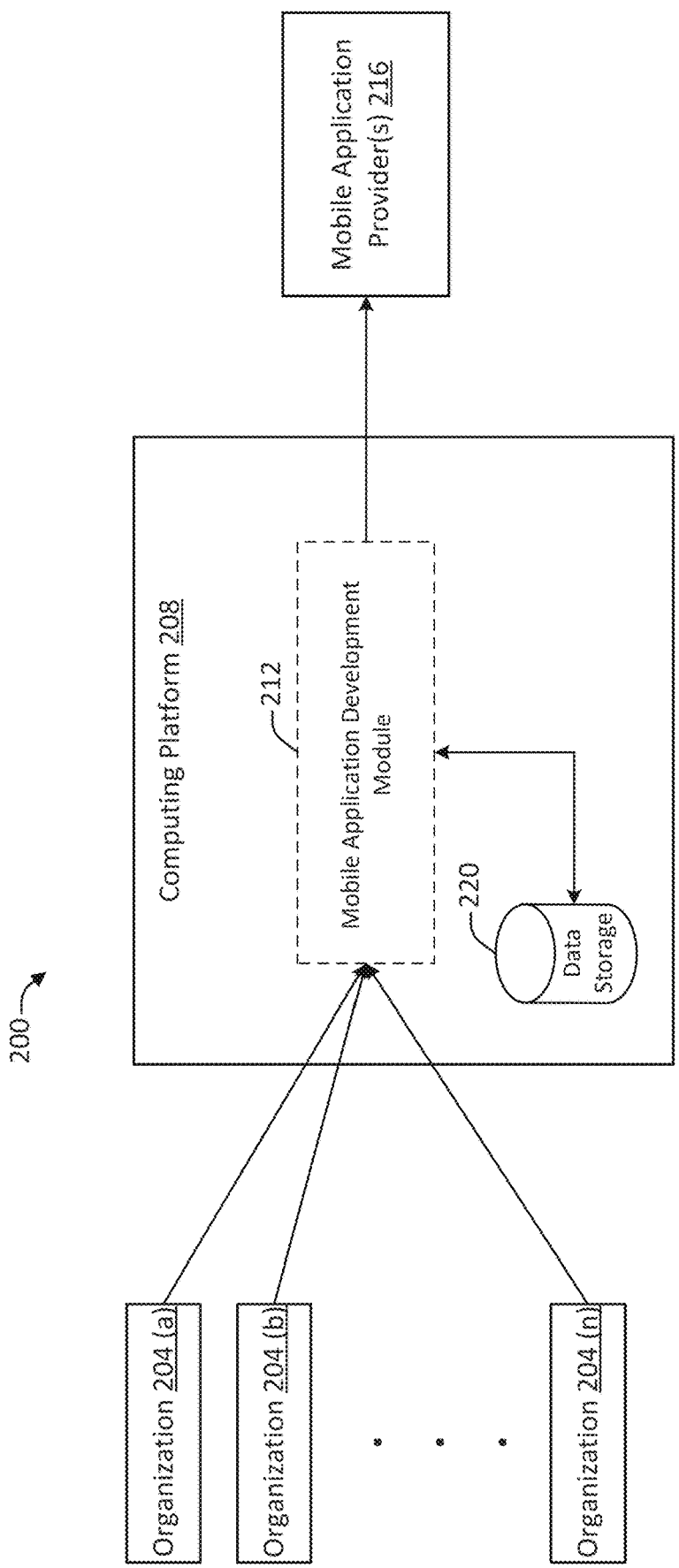
FIG. 2 shows a block diagram of an example of a mobile application development environment, in accordance with some implementations.
Figure 3:
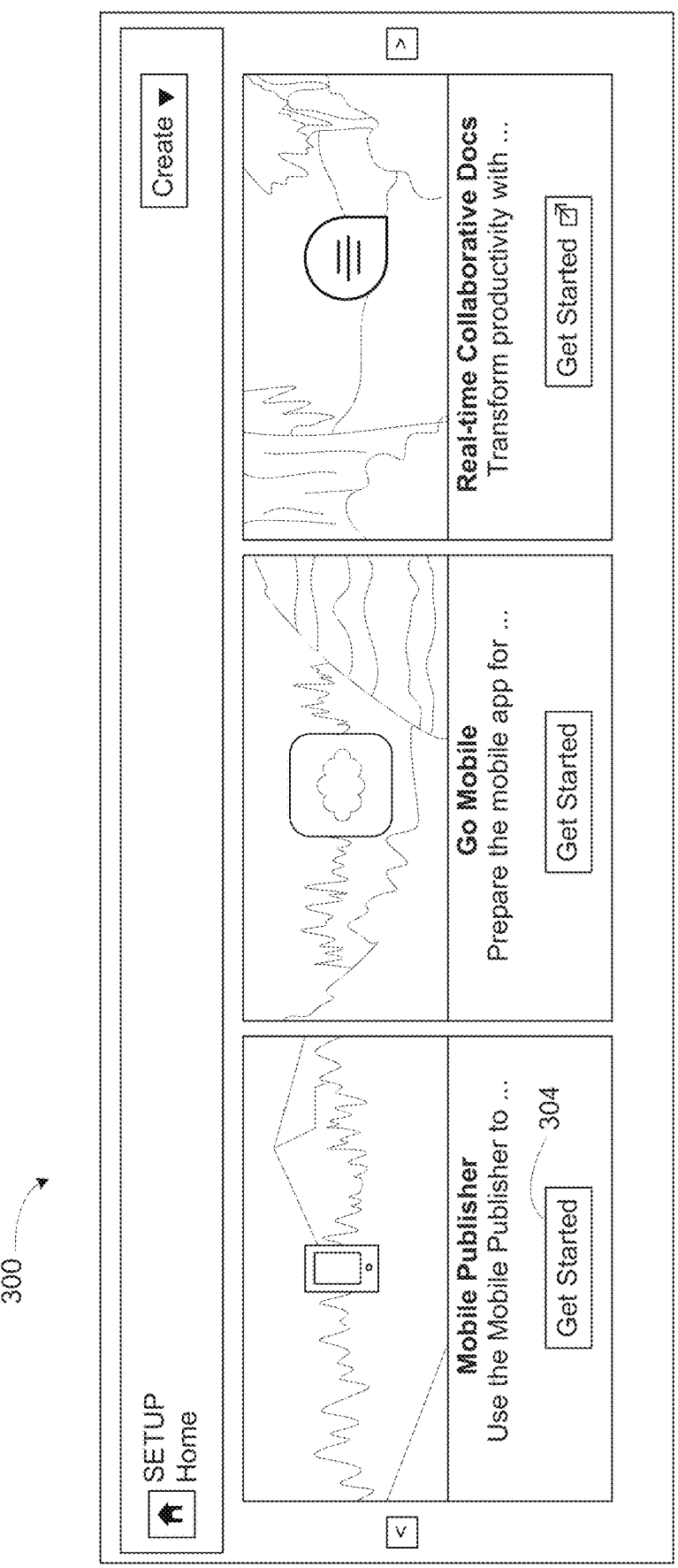
FIG. 3 shows an example of a Graphical User Interface (GUI), in accordance with some implementations.

FIG. 1 shows a flowchart of an example of a method for automatically producing mobile application binaries, performed in accordance with some implementations. FIG. 1 is described in the context of FIGS. 2-4. FIG. 2 shows a block diagram of an example of a mobile application development environment, in accordance with some implementations. FIG. 3 shows an example of a Graphical User Interface (GUI), in accordance with some implementations. FIG. 4 shows another example of a GUI, in accordance with some implementations.

At 104 of FIG. 1, a mobile application development environment may be maintained. In some implementations, the mobile application development environment may be maintained in association with a computing platform. By way of example, in mobile application development environment 200 of FIG. 2, organizations 204 (a)-(n) interact with computing platform 208. As discussed above, the computing platform 208 may be any type of computing platform and may have a variety of components such as a Customer Relationship Management (CRM) Platform, a social networking system, any type of consumer or business software, etc.

The computing platform 208 includes a mobile application development module 212, which may perform the automated application production and/or deployment techniques disclosed herein. For instance, in some implementations, users affiliated with the organizations 204 (a)-(n) may request production of mobile application binaries. The mobile application development module 212 may process such requests to generate such binaries. By way of example, HSS may use a CRM platform, such as one provided by Salesforce.com®, to host a "community," e.g., a customizable branded space for its employees, customers, and partners to connect. The community may be designable and/or customizable by authorized users affiliated with HSS. On behalf of HSS, General Bennet may request production of the HSS employee mobile application binary. In response to General Bennet's request, as discussed below, the mobile application development module 212 may access data stored in data storage 220 that defines the HSS community such as information defining the content, design, and/or layout of the community. The mobile application development module 212 may use this information, as well as any other information entered by General Bennet, to produce the binary of the HSS employee mobile application. For example, the mobile application development module 212 may use data stored in any of the data storage 220 to convert a web version of the HSS community into a binary of a mobile application such that the mobile application has the same or similar content, design, and/or layout as the web version of the HSS community.

In some implementations, users affiliated with the organizations 204 (a)-(n) may provide metadata to the mobile application development module 212. By way of example, on behalf of HSS, General Bennet may provide metadata to the mobile application development module 212 to define a HSS mobile application. As described below, the mobile application development module 212 may process metadata to automatically produce mobile applications for organizations 204 (a)-(n) providing the metadata. Returning to the above example, the mobile application development module 212 to may process the metadata provided by General Bennet to produce a HSS mobile application.

In some implementations, the mobile application development module 212 may automatically provide mobile applications to mobile application provider(s) 216, which may be any provider capable of providing mobile applications such as the Apple® App Store, the Android® app store, etc. Returning to the above example, the mobile application development module 212 may then provide the HSS mobile application Apple® app store.

In some implementations, the mobile application development module 212 may automatically provide ongoing maintenance and updates to features of mobile applications. Such maintenance and updates may be automatically performed without requiring users to provide additional metadata. By way of example, as compatibility requirements (e.g., with iOS® or Android®) change, the mobile application development module 212 may automatically update existing mobile applications (e.g., mobile applications that were developed in the mobile application development environment 200) using existing metadata to bring the mobile applications into compliance with the changing compatibility requirements. In another example, in response to new security updates being issued, the mobile application development module 212 may automatically update existing mobile applications using existing metadata.

In some implementations, the computing platform 208 may be provided to the organizations 204 (a)-(n) via an on-demand computing environment, as discussed further below in the context of FIGS. 12-14. By way of example, the computing platform 208 may be provided to the organizations 204 (a)-(n) in a multi-tenant database system, as described below. Similar to tenant data storage 1222 of FIG. 12, data storage 220 of FIG. 2 may store data of the organizations 204 (a)-(n) in a multi-tenant architecture. The mobile application development module 212 may access the data storage 220 and use an organizations 204 (a)-(n) data when producing a mobile application. Similarly, the mobile application development module 212 may store metadata defining an organizations 204 (a)-(n) mobile application in the data storage 220. Returning to the above example, the mobile application development module 212 may access HSS's data, which is stored in the data storage 220, when producing the HSS mobile application. Once General Bennet has provided metadata to define the HSS mobile application, the mobile application development module 212 may cause the metadata to be stored in the data storage 220.

In some implementations, requests to produce mobile application binaries may be entered via a user interface. By way of example, such a user interface may include input areas configured to receive input from a user to enter metadata to define a mobile application. By way of example, referring now to FIG. 3, General Bennet may be using her computing device to interact with the computing platform 208 of FIG. 2. General Bennet may navigate to home page 300 of FIG. 3. She may then click or tap "get started" button 304 to navigate to a mobile application development environment.

Returning to FIG. 1, at 108, a request to produce a binary of a mobile application (e.g., the HSS employee application) is processed. By way of example, using her computing device, General Bennet may request to produce a binary of the HSS employee application via a user interface of the mobile application development environment 200 of FIG. 2.

At 112 of FIG. 1, the binary (e.g., the binary of the HSS employee mobile application) and a package may be produced. By way of illustration, the mobile application development module 212 of the computing platform 208 of FIG. 2 may automatically produce the binary of the HSS mobile application and the package using the techniques described above.

In some implementations, the binary of the first mobile application may be produced in response to the request being processed at 112. By way of example, in response to General Bennet's request, the mobile application development module 212 of FIG. 2 may use data stored in any of the data storage 220 to convert a web version of the HSS community into a binary of a mobile application such that the mobile application has the same or similar content, design, and/or layout as the web version of the HSS community, as described above.

In some implementations, as discussed above, the package may include a script configurable to cause the binary to have the code-sign credentials of HSS for one or more mobile application providers. Such a script may vary based on the mobile application provider to which a binary is to be uploaded. By way of example, General Bennet may request that the binary of the HSS employee mobile application be produced for upload to the Apple® App Store. Since unsigned binaries may not be produced for the Apple® App Store, the binary of the HSS employee mobile application may initially be code-signed by the computing platform 208 of FIG. 2 when the binary is provided to HSS. In this case, the script may cause the code-sign credentials associated with the binary to change from code-sign credentials associated with the computing platform 208 to the code-sign credentials associated with HSS.

In an alternative example to that described in the preceding paragraph, General Bennet may request that the binary of the HSS employee mobile application be produced for upload to the Google® Play Store. Unsigned binaries may be produced for the Google® lay Store. Therefore, initial code-signing by the computing platform 208 of FIG. 2 may not be necessary. As such, in this case, the script may simply cause the binary to be code-signed by HSS rather than changing the code-sign certificate from that of the computing platform 208 to that of HSS.

In some implementations, as discussed above, the package produced at 112 of FIG. 1 may include instructions explaining how to execute the script to cause the binary to have the code-sign credentials of the requesting organization. By way of example, General Bennet may request that the binary of the HSS employee mobile application be produced for upload to the Apple® App Store. As such, the instructions may direct that General Bennet navigate to user interface (UI) 400 of FIG. 4. The instructions may direct General Bennet to register an "App ID" for the HSS employee mobile application by entering a description a description of the HSS employee mobile application into field 404. The instructions may direct General Bennet to enter a "Bundle ID" into field 408. The instructions may direct General Bennet to enable capabilities 412 that the computing platform 208 of FIG. 2 has included in the binary of the HSS employee mobile application. Once specification of the App ID is complete, the instructions may direct General Bennet to click or tap continue button 416 of FIG. 4.

In some implementations, the HSS employee mobile application may have push notification capabilities. As such, the instructions may direct General Bennet to create another certificate for a push notification extension. The instructions may the direct General Bennet to combine the push notification extension with the App ID described in the preceding paragraph. The instructions may then direct General Bennet to create provisioning profiles for the push notification extension and main HSS employee mobile application. Such provisioning profiles and the HSS signing certificate name may serve as inputs to the script described above. As such, the script may be executed using these inputs to cause the code-signing certificate of the binary of the HSS employee mobile application to be changed from the code-signing certificate of the computing platform 208 of FIG. 2 to the code-signing certificate of HSS.

One having skill in the art may appreciate that the instructions and scripts described herein are simply explanatory examples and may vary depending on which mobile application provider is used. For example, the techniques described in the context of producing the binary and the package at 112 of FIG. 1 may be suitably modified to produce a suitable script that is executable to cause the binary to be code-signed by HSS and uploaded to the Google® Play Store or any other mobile application provider.

At 116 of FIG. 1 the binary and the package may be provided to the organization. By way of example, the computing platform 208 of FIG. 2 may provide the package and the HSS employee mobile application binary to the HSS organization through a data network. General Bennet, for instance, may access the package and then HSS employee mobile application binary through a portal hosted by the computing platform 208.

In some implementations, at 120 of FIG. 1, it may be determined that the organization requesting binary production at 108 is a new customer of the computing platform. By way of illustration, Eyre Books is a small Braille Book publisher. Jane, the Chief Executive Officer (CEO) of Eyre Books, may use the disclosed techniques to develop a new Eyre Books mobile application binary. Eyre Books may be a new customer of the computing platform 208 of FIG. 2, and may not have any relationships with any mobile application providers yet. Accordingly, the computing platform 208 may make the determination that Eyre Books is a new customer of the computing platform 208.

In some implementations, at 124 of FIG. 1, assistance may be automatically provided the organization requesting binary production at 108. By way of example, responsive to determining, at 120, that the Eyre Books is a new customer of the computing platform 208 of FIG. 2, the computing platform 208 may provide assistance to Eyre Books. For instance, the computing platform 208 may automatically generate instructions for Eyre Books to create signing certificates for a variety of mobile application providers. Such instructions may be available through a portal hosted by the computing platform 208.

In some implementations, at 128 of FIG. 1, an updated version of the binary may be automatically produced. For instance, the computing platform 208 of FIG. 2 may add new capabilities to be included in produced mobile application binaries. By way of illustration, the initial iOS® version of the HSS employee mobile application may not be compatible with Apple's® Siri® capabilities. After production of the binary for the first iOS® version of the HSS employee mobile application, the computing platform 208 may gain the capability of producing Siri® compatible mobile application binaries. Accordingly, after the addition of this new capability, the computing platform 208 may automatically produce a binary of an updated version of the HSS employee mobile application that is Siri® compatible using the techniques described above.

Returning to FIG. 1, in some implementations, at 132, the updated version of the binary may be provided to an organization. Returning to the example of the preceding paragraph, the computing platform 208 of FIG. 2 may provide the binary of the updated version of the HSS employee mobile application to the HSS organization through a data network, as described above.

In some implementations, updated versions of binaries may be provided to organizations along with assistance in adding new capabilities. Returning again to the example of the preceding paragraph, the computing platform 208 of FIG. 2 may provide the binary of the updated version of the HSS employee mobile application to the HSS organization along with release notes explaining the updates to the HSS employee mobile application. The computing platform 208 may also provide instructions to navigate to the UI 400 of FIG. 4, and click or tap checkbox 420 to enable SiriKit. With SiriKit enabled, the binary of the updated version of the HSS employee mobile application may be automatically code-signed to HSS using the techniques described above, and uploaded to the Apple® App Store.

As discussed above, in some implementations, after the binary production process is complete, the computing platform 208 of FIG. 2 may completely cease to play a role in production and distribution of a mobile application, allowing distribution to be handled solely by an organization affiliated with the mobile application. By way of example, as a sophisticated organization with its own relationship with mobile application providers, HSS may only use the disclosed techniques for production of a mobile application binary of the HSS Employee mobile application. After the HSS Employee mobile application has been produced by the computing platform 208, HSS may completely take over distribution of the HSS Employee mobile application themselves. Accordingly, as described above, HSS may deal directly with mobile application providers in bringing the HSS Employee mobile application into accordance with the mobile application providers' rules. Furthermore, HSS may change the HSS Employee mobile application themselves and provide the HSS Employee mobile application in new regions without having to return to the computing platform 208 to update the HSS Employee mobile application.

The disclosed mobile application production and distribution techniques may be applied differently depending on the type and/or needs of organizations that are implementing the disclosed techniques. As discussed above, distribution may be handled exclusively by an organization. On the other hand, in some implementations, a computing platform may provide automated distribution of mobile applications. By way of illustration, Jane, may use the disclosed techniques to develop a new Eyre Books mobile application binary. As described above, the binary may be automatically produced. However, in addition to binary production and uploading, the disclosed techniques may also be used for automated distribution of the Eyre Books mobile application to a mobile application provider, allowing employees and/or customers to download the application. By way of illustration, unlike sophisticated organizations like HSS, as described above, less sophisticated organizations like Eyre Books may wish to use the disclosed techniques in parallel with automated distribution. For instance, once mobile application binary production for the Eyre Books mobile application is complete, an authorized user of the computing platform affiliated with Eyre Books may select their distribution preferences by selecting a distribution type. As the Eyre Books mobile application may then be automatically distributed to mobile application provider(s) in accordance with Eyre Books' distribution preferences.

Figure 5:
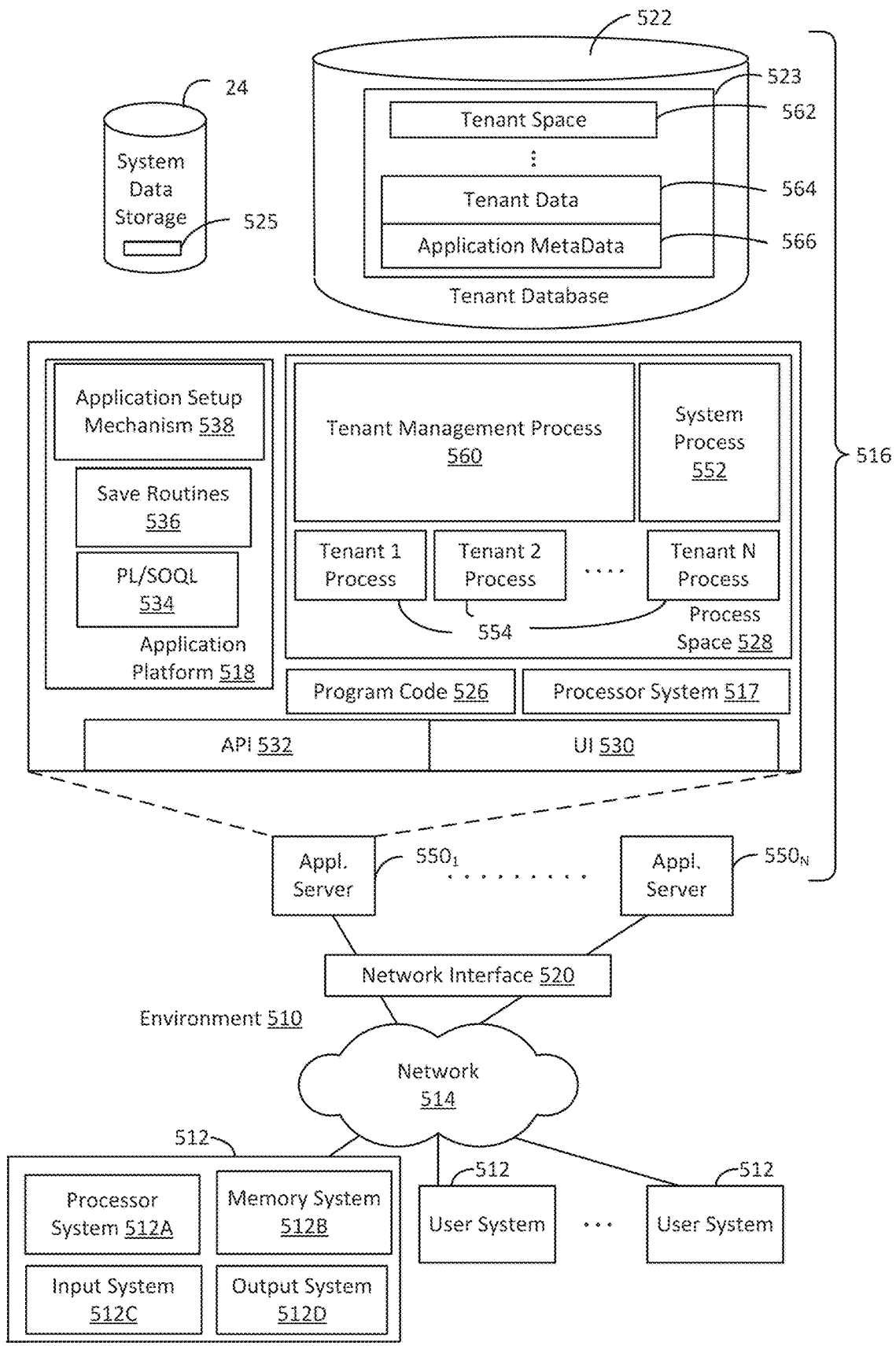
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based mobile application production and/or deployment system. For example, in some implementations, system 516 may include application servers configured to implement and execute a variety of software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a mobile application production and/or deployment system, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al, issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
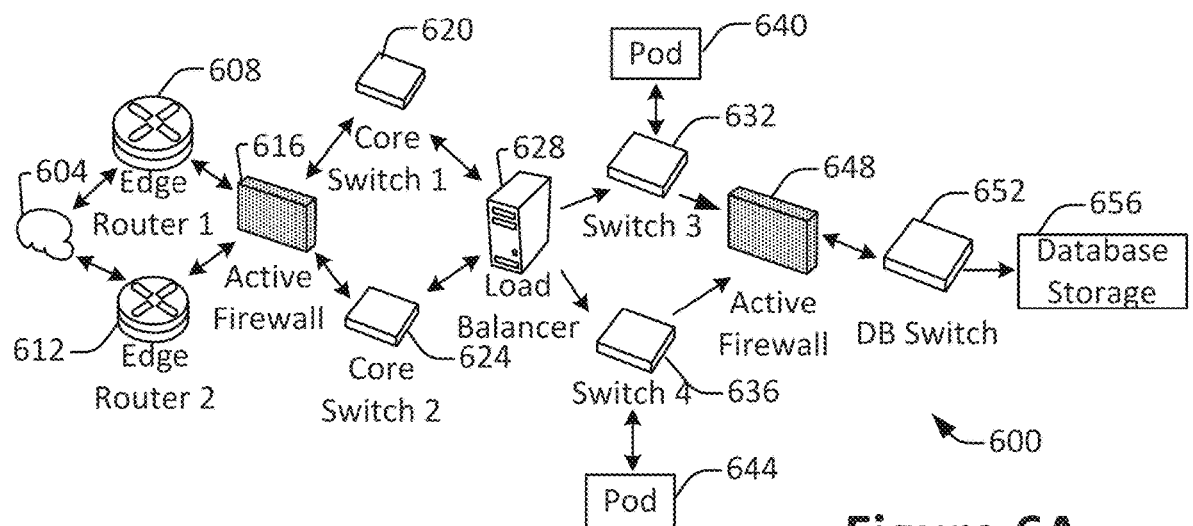
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process a variety of information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
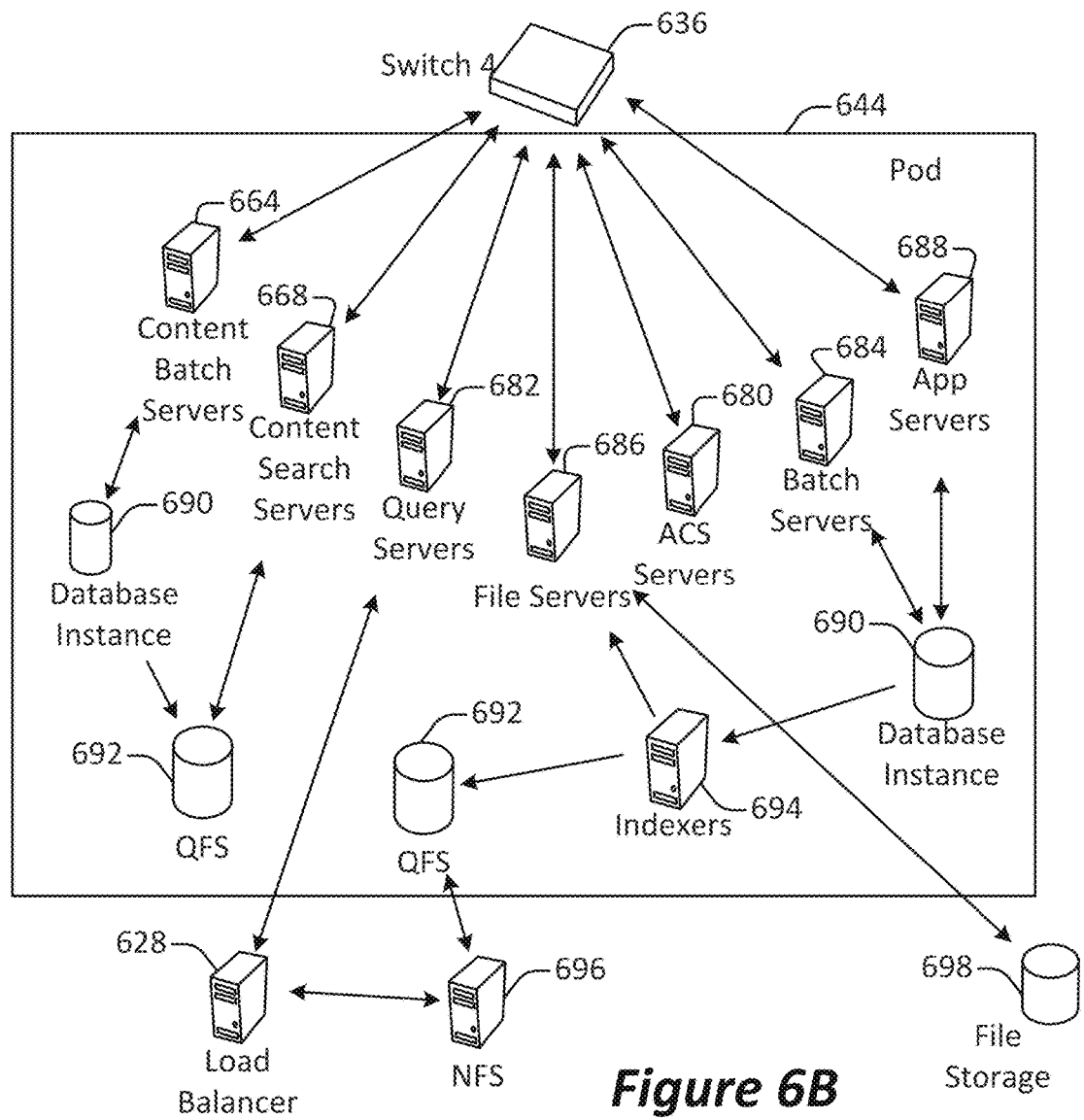
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
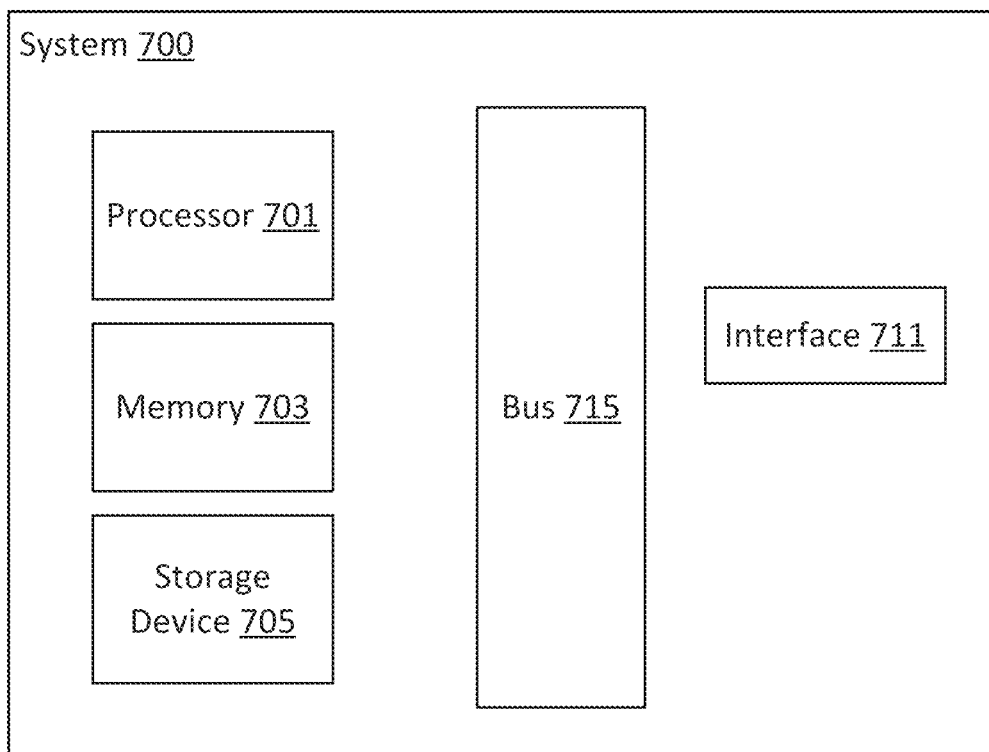
FIG. 7 illustrates one example of a computing device, configured in accordance with some implementations.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing system implemented by a server system, the computing system comprising:
one or more computer processors; and
a computer-readable storage medium comprising instructions for controlling the one or more computer processors, the instructions being configurable to cause:
maintaining a mobile application development environment associated with a computing platform, the mobile application development environment configurable to produce mobile applications based on information provided to the computing platform;
processing, from a first organization, a request to produce a binary of a first mobile application, wherein the first mobile application is associated with the first organization;
responsive to processing the request, automatically producing, by the computing platform:
the binary of the first mobile application for upload to a mobile application provider, the first organization being different from the mobile application provider, and
a package configurable to cause the binary to have code-sign credentials associated with the first organization when the binary is uploaded to the mobile application provider, wherein the package comprises a script configurable to cause the binary to have the code-sign credentials associated with the first organization; and
providing, to the first organization, the binary and the package, wherein the binary is code-signed by the computing platform when the binary is provided to the first organization and the script causes code-sign credentials associated with the binary to change from code-sign credentials associated with the computing platform to the code-sign credentials associated with the first organization.

2. The computing system of claim 1, wherein the package comprises instructions explaining how to cause the binary to have the code-sign credentials associated with the first organization.

3. The computing system of claim 1, the computing system being further configurable to cause:
automatically producing an updated version of the binary; and
providing, to the first organization, the updated version of the binary.

4. The computing system of claim 3, wherein the updated version of the binary is provided to the first organization along with assistance to the first organization in adding new capabilities available to the updated version of the binary.

5. The computing system of claim 1, the instructions being further configurable to cause:
- determining that the first organization is a new customer of the computing platform; and
- automatically providing, responsive to determining that the first organization is the new customer of the computing platform, assistance in creating signing certificate for the mobile application provider.

6. The computing system of claim 1, wherein the computing platform comprises a customer relationship management (CRM) platform and the binary is produced based on a customizable branded space associated with the first organization, the customizable branded space being hosted by the CRM platform.

7. The method of claim 1, wherein the binary is in compliance with a rule of the mobile application provider when the binary is uploaded to the mobile application provider.

8. A method comprising:
- maintaining a mobile application development environment associated with a computing platform, the mobile application development environment configurable to produce mobile applications based on information provided to the computing platform;
- processing, from a first organization, a request to produce a binary of a first mobile application, wherein the first mobile application is associated with the first organization;
- responsive to processing the request, automatically producing, by the computing platform:
  - the binary of the first mobile application for upload to a mobile application provider, the first organization being different from the mobile application provider, and
  - a package configurable to cause the binary to have code-sign credentials associated with the first organization when the binary is uploaded to the mobile application provider, wherein the package comprises a script configurable to cause the binary to have the code-sign credentials associated with the first organization; and
- providing, to the first organization, the binary and the package, wherein the binary is code-signed by the computing platform when the binary is provided to the first organization and the script causes code-sign credentials associated with the binary to change from code-sign credentials associated with the computing platform to the code-sign credentials associated with the first organization.

9. The method of claim 8, wherein the package comprises instructions explaining how to cause the binary to have the code-sign credentials associated with the first organization.

10. The method of claim 8, the method further comprising:
- automatically producing an updated version of the binary; and
- providing, to the first organization, the updated version of the binary.

11. The method of claim 10, wherein the updated version of the binary is provided to the first organization along with assistance to the first organization in adding new capabilities available to the updated version of the binary.

12. The method of claim 8, the method further comprising:
- determining that the first organization is a new customer of the computing platform; and
- automatically providing, responsive to determining that the first organization is the new customer of the computing platform, assistance in creating signing certificate for the mobile application provider.

13. The method of claim 8, wherein the computing platform comprises a customer relationship management (CRM) platform and the binary is produced based on a customizable branded space associated with the first organization, the customizable branded space being hosted by the OM platform.

14. The method of claim 1, wherein the first organization may bring the first mobile application into compliance with a rule of the mobile application provider.

15. A computer program product comprising computer-readable program code capable stored on a non-transitory computer-readable medium, the program code comprising instructions to cause:
- maintaining a mobile application development environment associated with a computing platform, the mobile application development environment configurable to produce mobile applications based on information provided to the computing platform;
- processing, from a first organization, a request to produce a binary of a first mobile application, wherein the first mobile application is associated with the first organization;
- responsive to processing the request, automatically producing, by the computing platform:
  - the binary of the first mobile application for upload to a mobile application provider, the first organization being different from the mobile application provider, and
  - a package configurable to cause the binary to have code-sign credentials associated with the first organization when the binary is uploaded to the mobile application provider, wherein the package comprises a script configurable to cause the binary to have the code-sign credentials associated with the first organization; and
- providing, to the first organization, the binary and the package, wherein the binary is code-signed by the computing platform when the binary is provided to the first organization and the script causes code-sign credentials associated with the binary to change from code-sign credentials associated with the computing platform to the code-sign credentials associated with the first organization.

16. The computer program product of claim 15, wherein the package comprises instructions explaining how to cause the binary to have the code-sign credentials associated with the first organization.

17. The computer program product of claim 15, the instructions further configurable to cause:
- automatically producing an updated version of the binary; and
- providing, to the first organization, the updated version of the binary.

18. The computer program product of claim 17, wherein the updated version of the binary is provided to the first organization along with assistance to the first organization in adding new capabilities available to the updated version of the binary.

19. The computer program product of claim 15, the instructions further configurable to cause:
- determining that the first organization is a new customer of the computing platform; and automatically providing, responsive to determining that the first organization is the new customer of the computing platform, assistance in creating signing certificate for the mobile application provider.

20. The method of claim 1, wherein the first organization changes the first mobile application prior to submitting the first mobile application to the mobile application provider.

\* \* \* \* \*